United States Patent
Choi et al.

(10) Patent No.: US 10,882,632 B2
(45) Date of Patent: Jan. 5, 2021

(54) FIXED TEMPERATURE MAINTENANCE SYSTEM FOR ENGINE IN UNMANNED AIRCRAFT HAVING AUTOMATIC THROTTLE LIMITING DEVICE

(71) Applicant: KOREAN AIR LINES CO., LTD., Seoul (KR)

(72) Inventors: Seung Kie Choi, Daejeon (KR); Shin Je Cho, Daejeon (KR); Sang Hun Lee, Daejeon (KR)

(73) Assignee: KOREAN AIR LINES CO., LTD., Seoul (KR)

( * ) Notice: Subject to any disclaimer, the term of this patent is extended or adjusted under 35 U.S.C. 154(b) by 165 days.

(21) Appl. No.: 15/542,418

(22) PCT Filed: Jan. 11, 2016

(86) PCT No.: PCT/KR2016/000220
§ 371 (c)(1),
(2) Date: Jul. 7, 2017

(87) PCT Pub. No.: WO2016/111597
PCT Pub. Date: Jul. 14, 2016

(65) Prior Publication Data
US 2018/0118361 A1    May 3, 2018

(30) Foreign Application Priority Data
Jan. 9, 2015   (KR) .................. 10-2015-0003357

(51) Int. Cl.
| | |
|---|---|
| *B64D 31/06* | (2006.01) |
| *F02D 41/14* | (2006.01) |
| *F02D 9/02* | (2006.01) |
| *F02D 41/26* | (2006.01) |
| *B64D 33/08* | (2006.01) |
| *F02D 41/00* | (2006.01) |
| *B64C 39/02* | (2006.01) |

(52) U.S. Cl.
CPC ............ *B64D 31/06* (2013.01); *B64C 39/024* (2013.01); *B64D 33/08* (2013.01); *F02D 9/02* (2013.01);
(Continued)

(58) Field of Classification Search
CPC .. F02D 9/02; F02D 2200/021; F02D 2400/06; F02D 41/0002; B64C 2201/044;
(Continued)

(56) References Cited

U.S. PATENT DOCUMENTS 6,073,610 A * 6/2000 Matsumoto ........... F02D 11/107
123/396
7,431,243 B1 * 10/2008 Allen ................... G05D 1/0005
244/16

(Continued)

FOREIGN PATENT DOCUMENTS

| KR | 10-1997-0046467 A | 7/1997 |
|---|---|---|
| KR | 10-1999-0039491 A | 6/1999 |

(Continued)

*Primary Examiner* — John M Zaleskas
(74) *Attorney, Agent, or Firm* — Rabin & Berdo, P.C.

(57) ABSTRACT

A system for maintaining a constant temperature of an engine in an unmanned aerial system with an autothrottle limiting device comprises an autopilot for issuing a throttle command, an autothrottle limiting device for automatically limiting an upper limit of the throttle command issued by the autopilot, and a rotary engine for feeding an internal temperature of the engine back to the autothrottle limiting device. The system is applicable to all kinds of unmanned aerial systems employing an air-cooling rotary engine, uses the existing autopilot of the unmanned aerial system without modification, and improves the reliability and life of the engine.

3 Claims, 1 Drawing Sheet

(52) U.S. Cl.
CPC ......... *F02D 41/0002* (2013.01); *F02D 41/14* (2013.01); *F02D 41/1401* (2013.01); *F02D 41/26* (2013.01); *B64C 2201/044* (2013.01); *F02D 2200/021* (2013.01); *F02D 2400/06* (2013.01); *Y02T 10/40* (2013.01)

(58) Field of Classification Search
CPC . B64C 2201/141; B64C 39/024; B64D 31/06; Y02T 10/42
USPC ................................................ 701/5, 11, 102
See application file for complete search history.

(56) References Cited

U.S. PATENT DOCUMENTS

| | | | |
|---|---|---|---|
| 2003/0060962 A1* | 3/2003 | Carroll | B64C 39/024 701/103 |
| 2005/0194494 A1* | 9/2005 | MacDougall | B64D 31/00 244/76 R |
| 2012/0298083 A1* | 11/2012 | Howell | F02B 25/26 123/65 R |
| 2014/0032013 A1* | 1/2014 | Riley | G01C 23/00 701/2 |
| 2014/0230761 A1* | 8/2014 | Pilavdzic | F01P 3/2271 123/41.21 |
| 2015/0176515 A1* | 6/2015 | Barber | F02D 41/021 123/295 |
| 2015/0314869 A1* | 11/2015 | Lemus Martin | G05D 1/0005 701/3 |
| 2018/0088594 A1* | 3/2018 | Moon | B64C 39/024 |

FOREIGN PATENT DOCUMENTS

| | | |
|---|---|---|
| KR | 10-2000-0021742 A | 4/2000 |
| KR | 10-1329201 B | 11/2013 |
| KR | 10-1392267 B | 5/2014 |

\* cited by examiner

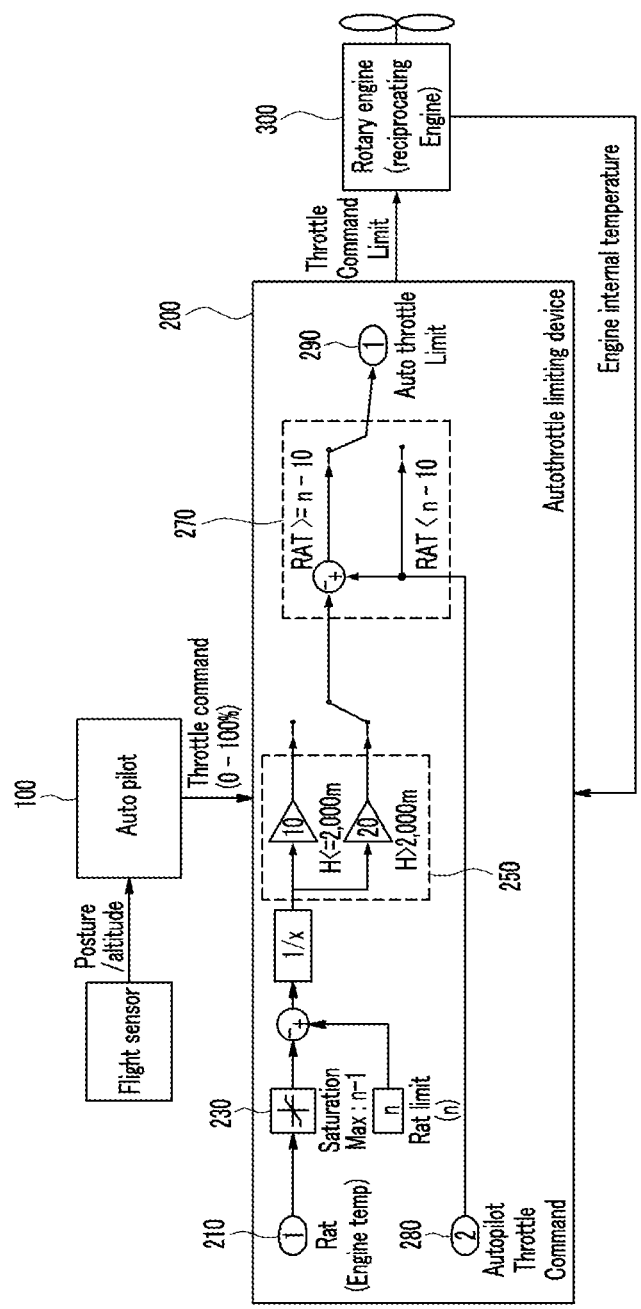

FIXED TEMPERATURE MAINTENANCE SYSTEM FOR ENGINE IN UNMANNED AIRCRAFT HAVING AUTOMATIC THROTTLE LIMITING DEVICE

TECHNICAL FIELD

The present invention relates a system for maintaining a constant temperature of an engine in an unmanned aerial system with an autothrottle limiting device, and more particularly to a system for maintaining a constant temperature of an engine in an unmanned aerial system with an autothrottle limiting device, as an apparatus for automatically limiting an upper limit of a throttle position command output from an autopilot by feedback on the internal temperature of the engine, which can elevate the aerial vehicle with an optimum throttle position, and maintain a constant internal temperature of the engine to thereby improve mission efficiency and engine reliability.

BACKGROUND ART

In case of a unmanned aerial system that generally uses a rotary engine (i.e. a reciprocating engine), the engine is cooled using external air without any separate cooling device due to the limited loading space and weight of the aerial-vehicle. If the unmanned aerial system flies at high altitude in scorching seasons, the engine is not sufficiently cooled because of external hot air and a full-open throttle, and thus the temperature inside the engine (i.e. inside a cylinder or rotor) easily increases, thereby significantly lowering mission efficiency and engine reliability.

Further, the existing unmanned aerial system has problems that an operator has to often intervene in a flight for cooling the engine whenever the temperature of the engine increases, and a shortened life of the engine and an accident in the aerial vehicle are frequently caused as the engine exceeds its limited temperature since the full-open throttle is excessively used to avoid a collision with a terrain during taking-off and landing in mountainous areas.

PRIOR ART

Patent Document

Korean Patent No. 10-1329201 (2013.11.07)

DISCLOSURE

Technical Problem

Accordingly, the present invention is conceived to solve the foregoing problems, and an object of the present invention is to provide a system for maintaining a constant temperature of an engine in an unmanned aerial system with an autothrottle limiting device, as an apparatus for automatically limiting an upper limit of a throttle position command output from an autopilot by feedback on the internal temperature of the engine, which can elevate the aerial vehicle with an optimum throttle position, and maintain a constant internal temperature of the engine to thereby improve mission efficiency and engine reliability.

Technical Solution

In accordance with one aspect of the present invention, there is provided a system for maintaining a constant temperature of an engine in an unmanned aerial system with an autothrottle limiting device, the system comprising: an autopilot 100 for issuing a throttle command; an autothrottle limiting device 200 for automatically limiting an upper limit of the throttle command issued by the autopilot 100; and a rotary engine 300 for feeding an internal temperature of the engine of the autopilot 100 back to the autothrottle limiting device 200.

The autothrottle limiting device 200 may comprise an engine temperature receiver 210 for continuously receiving an engine internal temperature (i.e. rotor air temperature (RAT)) of the rotary engine 300; an autothrottle command-value receiver 280 for receiving an autothrottle command-value from the autopilot 100; an autothrottle limited-value subtraction unit 290 for subtracting an autothrottle limited-value from the autothrottle command value; a limited operating-temperature setting and switching unit 270 for setting and switching a limited operating temperature for the internal temperature so as to operate the autothrottle limiting device; an engine maximum internal-temperature limiter 230 for limiting a maximum value of the engine internal temperature fed back to and received in the engine temperature receiver 210; and an autothrottle limited-value calculator 250 for calculating the autothrottle limited-value by multiplying the engine internal temperature, of which the maximum value is limited, and a gain value.

Advantageous Effects

According to the present invention, a system for maintaining a constant temperature of an engine in an unmanned aerial system with an autothrottle limiting device is applicable to all the kinds of unmanned aerial systems employing an air-cooling rotary engine (i.e. reciprocating engine), uses the existing autopilot of the unmanned aerial system without modification, improves the reliability and life of the engine, and safely takes the aerial vehicle back without accidents in the engine even though communication with a terrestrial system is interrupted.

DESCRIPTION OF DRAWINGS

FIG. 1 is a block diagram of a system for maintaining a constant temperature of an engine in an unmanned aerial system with an autothrottle limiting device according to an exemplary embodiment.

BEST MODE

Below, embodiments of the present invention will be described in detail with reference to accompanying drawings. In the following description, terms or words used in the specification and claims are construed as not typical or lexical meaning but meaning and concept corresponding to the idea of the present invention on the principle that the inventor can properly define the concept of the terms in order to explain his/her own invention for the best.

Therefore, it has to be understood that various equivalents and alternatives can be made at the time of filing the present invention since the descriptions of the specification and the features shown in the drawings are no other than preferred embodiments without reflecting all the technical ideas of the present invention.

FIG. 1 is a block diagram of a system for maintaining a constant temperature of an engine in an unmanned aerial system with an autothrottle limiting device according to an exemplary embodiment.

As shown in FIG. 1, a system for maintaining a constant temperature of an engine in an unmanned aerial system with an autothrottle limiting device includes an autopilot 100, an autothrottle limiting device 200 and a rotary engine 300.

The autothrottle limiting device 200 includes an engine temperature receiver 210, an engine maximum internal-temperature limiter 230, a limited operating-temperature setting and switching unit 270, an autothrottle command-value receiver 280, and an autothrottle limited-value subtraction unit 290.

The engine temperature receiver 210 continuously receives an internal temperature of the rotary engine 300, i.e. an engine internal temperature (or rotor air temperature (RAT).

The autothrottle command-value receiver 280 receives an autothrottle command value from the autopilot 100.

The autothrottle limited-value subtraction unit 290 subtracts an autothrottle limited-value from the autothrottle command value received in the autothrottle command-value receiver 280.

The limited operating-temperature setting and switching unit 270 sets and switches a limited operating temperature for the internal temperature so that the autothrottle limiting device according to the present invention can operate.

For example, in case where the limited operating temperature for the internal temperature is set to 'n' as shown in FIG. 1, the limited operating-temperature setting and switching unit 270 makes the autothrottle limiting device be automated if the current internal temperature is higher than 'n−10,' but makes the autothrottle limiting device use the autothrottle command-value if the internal temperature is not higher than 'n−10.'

By the way, the autothrottle limited-value for the autothrottle limited-value subtraction unit 290 is calculated by the following [Equation 1].

$$\text{Throttle Limit} = 1/(\text{RAT Limit}(n) - \text{RAT}) \times (10 \text{ or } 20) \quad \text{[Equation 1]}$$

Referring to the Equation 1, the autothrottle limited-value subtraction unit 290 takes the reciprocal of a difference between the limited operating temperature set by the limited operating temperature setting and switching unit 270 and the current engine internal temperature.

To prevent the engine internal temperature from being abnormally measured by failure in a thermometer, the engine maximum internal-temperature limiter 230 limits the maximum value of the engine internal temperature fed back to and received in the engine temperature receiver 210.

In addition, an autothrottle limited-value calculator 250 calculates the autothrottle limited-value by multiplying the engine internal temperature, of which the maximum value is limited, and a gain value together.

In particular, at an altitude higher than 2,000 m in the atmosphere, the engine internal temperature rises easily since air becomes thinner.

Therefore, the autothrottle limited-value calculator 250 uses a low gain value 10 at an altitude equal to or lower than 2,000 m, but uses a high gain value 20 at an altitude higher than 2,000 m.

For reference, if the engine internal temperature approximates to the limited operating temperature for the internal temperature, the autothrottle limited-value becomes higher to decrease the throttle, thereby having an effect on lowering the engine internal temperature.

As described above, it is possible to decrease computer resources since the simple equation is used in automatically controlling the throttle, and the limited value makes it possible to stably operate the system for maintaining a constant temperature of an engine in an unmanned aerial system according to the present invention even in abnormal situations.

Although a few exemplary embodiments have been shown and described, it will be appreciated by those skilled in the art that changes may be made in these exemplary embodiments without departing from the principles and spirit of the invention, the scope of which is defined in the appended claims and their equivalents.

REFERENCE NUMERALS

100: autopilot
200: autothrottle limiting device
210: engine temperature receiver
230: engine maximum internal-temperature limiter
270: limited operating-temperature setting and switching unit
280: autothrottle command-value receiver
290: autothrottle limited-value subtraction unit
300: rotary engine

The invention claimed is:

1. A system for maintaining a constant temperature of an engine in an unmanned aerial system, comprising:
   an autopilot for issuing a throttle command; and
   an autothrottle limiting device for automatically limiting an upper limit of the throttle command issued by the autopilot, based on an engine internal temperature fed back to the autothrottle limiting device from the engine;
   wherein the autothrottle limiting device comprises
   an autothrottle command value receiver for receiving an autothrottle command value from the autopilot;
   an autothrottle limited value subtraction unit for subtracting an autothrottle limited value from the autothrottle command value;
   an engine temperature receiver for continuously receiving the engine internal temperature of the engine;
   a limited operating temperature setting and switching unit for setting and switching a limited operating temperature for the engine internal temperature so as to operate the autothrottle limiting device;
   an engine maximum internal temperature limiter for limiting a maximum value of the engine internal temperature fed back to and received in the engine temperature receiver; and
   an autothrottle limited value calculator for calculating the autothrottle limited value by multiplying the engine internal temperature, of which the maximum value is limited, and a gain value.

2. The system according to claim 1, wherein, in a case where the limited operating temperature for the engine internal temperature is set to a predetermined value, the limited operating temperature setting and switching unit makes the autothrottle limiting device be automated if the engine internal temperature is higher than the predetermined value reduced by a predetermined amount, but makes the autothrottle limiting device use the autothrottle command value if the engine internal temperature is not higher than the predetermined value reduced by the predetermined amount.

3. The system according to claim 1, wherein the autothrottle limited value calculator multiplies the engine internal temperature, of which the maximum value is limited, and the gain value, the gain value being varied depending on altitudes.

* * * * *